April 25, 1933.  H. ALBERTINE  1,905,878
LUBRICATING APPARATUS
Filed May 16, 1928   2 Sheets-Sheet 1
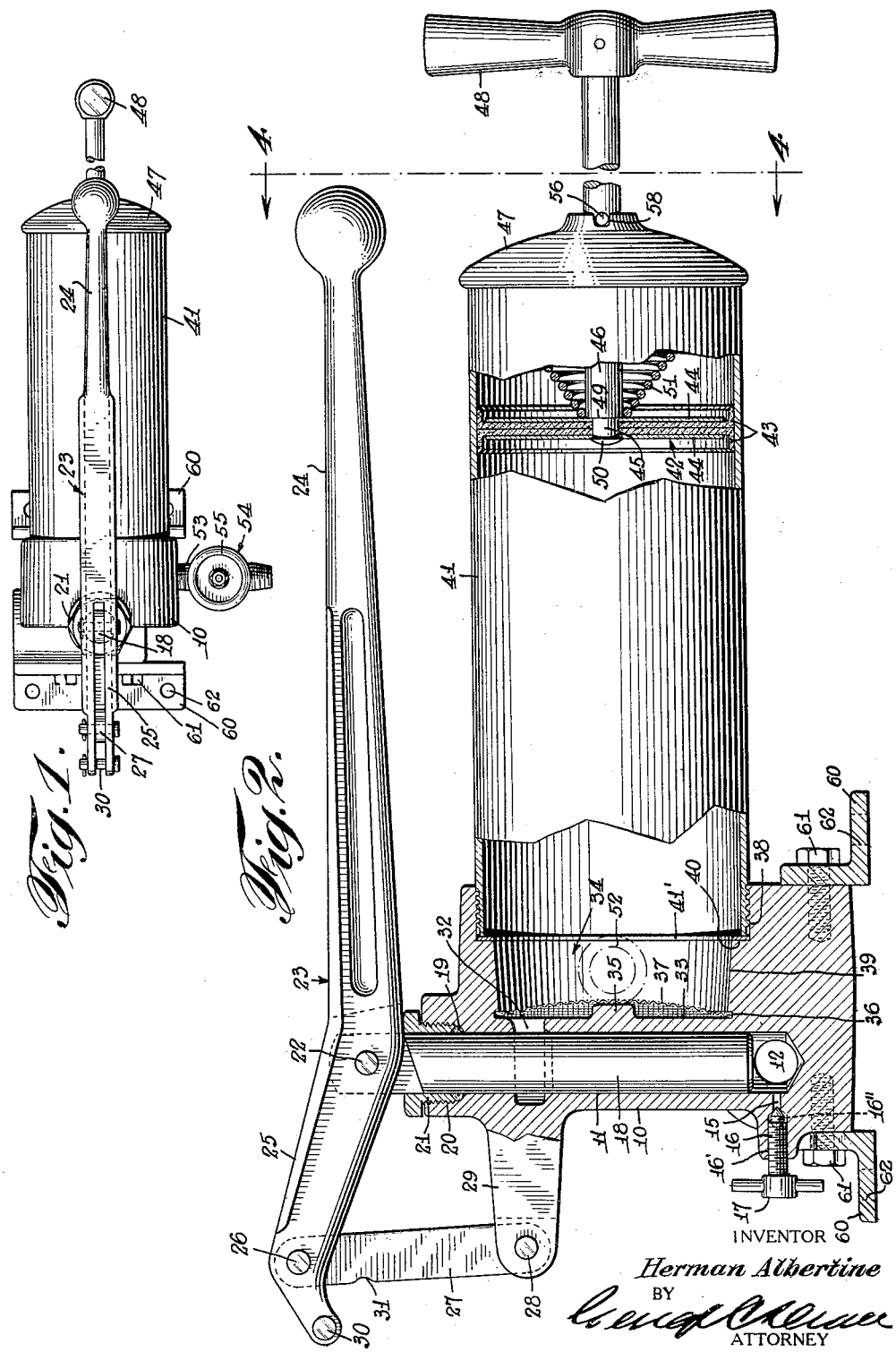
INVENTOR
*Herman Albertine*
BY
ATTORNEY

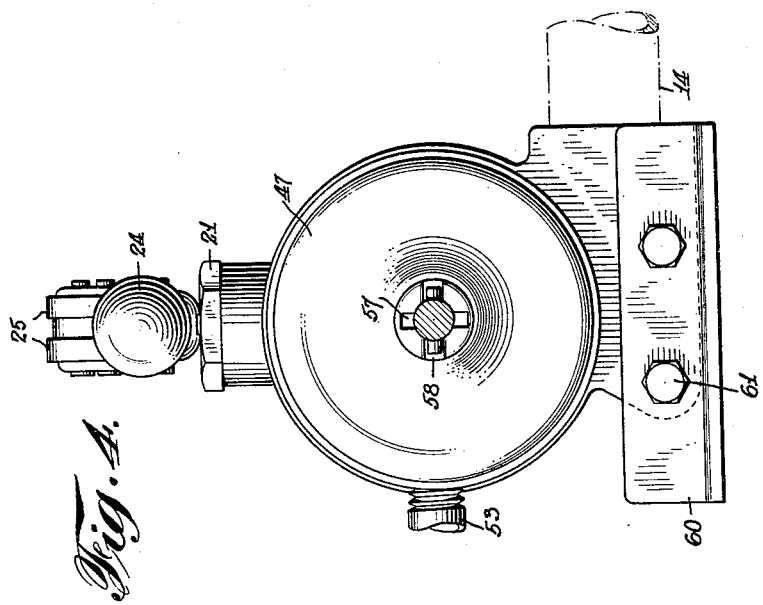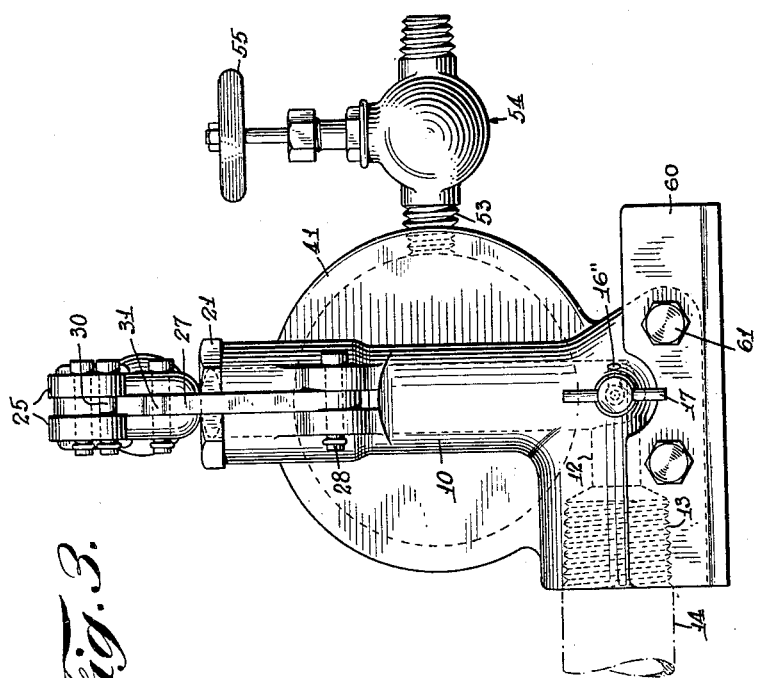

Patented Apr. 25, 1933

1,905,878

UNITED STATES PATENT OFFICE

HERMAN ALBERTINE, OF EAST RUTHERFORD, NEW JERSEY, ASSIGNOR TO ROGERS PRODUCTS COMPANY, INC., A CORPORATION OF NEW JERSEY

LUBRICATING APPARATUS

Application filed May 16, 1928. Serial No. 278,289.

My present invention relates to force feed lubricators or grease guns of the same general nature as that shown in my prior application Ser. No. 190,726, filed May 12, 1927. The apparatus is designed to supply lubricant, such as oil or grease, to bearings and, as disclosed in said application, the lubricant in a cylindrical reservoir is forced toward an open end of the reservoir which is detachably secured in a socket in a support having a booster pump cylinder therein extending across the axis of the socket below the floor thereof and receiving lubricant therefrom through a passage opening into said socket at the base thereof and constituting an outlet for said reservoir. The pump also includes a plunger piston fitting said cylinder and a long operating lever pivoted to said plunger and also to a link pivoted at its other end to said support, the arrangement being such that the lever is swung downwardly to a horizontal position in its pressure or compression stroke.

According to one feature of the present invention, the support is constructed with a substantially vertical pump cylinder and with a socket having its axis substantially horizontal to receive one end of a cylindrical reservoir and support it in a horizontal position.

Operation of the plunger in the pump cylinder is effected by means of a relatively long operating lever pivoted at an intermediate point to said plunger so that the handle thereof may be forced down parallel to the reservoir in the pressure producing stroke, the work arm of the lever being pivoted to a link which is also pivoted to said support.

Another feature consists in a provision of a strainer at the base of said socket and through which the lubricant must pass as it moves through the outlet to the pump cylinder.

The invention also includes the feature of providing a space between the inner end of the reservoir when secured in position in the support, and the base of said socket so that by forcing lubricant into this space the reservoir may be filled and the usual follower or piston in the reservoir forced back during such filling operation. When a strainer is used, the lubricant inlet will be located on the intake or reservoir side of the strainer and the reservoir, suitable provisions being made to limit the expelling movement of the piston so that it will not cover the opening through which lubricant is forced into the reservoir.

While my grease gun is adapted for general use, it is particularly adapted for use in systems having permanently installed gun for the lubricating system of each machine, or, if desired, for each bearing to which lubricant is to be supplied. In such case, all the guns of a shop or plant may be filled by moving a receptacle or drum of lubricant from gun to gun by suitable means, such as a truck or trolley and pumping lubricant from the receptacle or drum into the inner portion of the socket in the support.

The above and other features of my invention will be more evident from the following detailed description in connection with the accompanying drawings, in which Fig. 1 is a top plan view of a desirable form of the apparatus;

Fig. 2 is a side elevation partly in section to show the internal arrangement;

Fig. 3 is a view in elevation of the end at the left in Fig. 1; and

Fig. 4 is a view in elevation taken along the line 4—4.

As shown most clearly in Fig. 2, the head 10, which may be in the form of an integral casting, is provided with a vertical bore 11 constituting a pump cylinder and opening upwardly through the top of the casting. At its lower end the bore 11 is connected with a transverse bore or passage 12, which, as indicated in Fig. 3, communicates with a large internally threaded socket 13 into which is screwed the threaded end of a conduit, 14, through which lubricant is forced to the desired point.

There is also provided at the base of the bore 11 a passage 15 forming a vent for the removal of air or lubricant when required. At its outer end the passage 15 may be closed by suitable means, such as the conical tip of a screw 16 threaded in a larger opening 16' aligned with the passage 15 and controlled by a handle 17. Upon turning the screw 16 to open the end of the passage 15, venting may be effected through a passage 16″ extending from the inner end of the passage 16′ to the outer surface of the support 10. The same effect might be obtained by means of a longitudinal groove at the surface of the screw or in the surface of the passage in which it was threaded.

The pump also includes a piston preferably in the form of a plunger 18 which fits closely in the bore 11 and extends out of the upper end thereof where a close seal is effected by means of packing 19 wedged into the tapered lower end of an internally threaded chamber 20 by means of an externally threaded sleeve or bushing 21 fitting around the plunger 18 and screwed into said chamber 20. At its top the plunger 18 is connected by a pivot 22 with a lever 23 having a long handle 24 extending to the right (Fig. 2) and a work arm 25 pivoted at 26 to the upper end of the link 27 which is pivoted at 28 to a bracket 29 projecting from the support 10.

As clearly shown on the drawings, the work arm 25 of the lever 23 is forked and comprises two parallel portions between which extend the upper ends of the plunger 18 and the link 27, and the bracket 29 is also forked at its outer end to receive the link 27 between two spaced parts thereof. In this arrangement, substantially the whole length of the lever 23 serves as the power arm and inasmuch as the lever is arranged for a down-stroke actuation, the lubricant may be forced out of the pump cylinder under a high pressure. As shown in Fig. 2, the downward movement of the arm 24 is limited by engagement with sleeve 21 and the upward movement of the handle 24 is limited by engagement of a pin 30 at the outer end of the forked arm 25 with the left hand edge (Fig. 2) of the link 27 at the depression 31.

Lubricant is supplied to the cylindrical bore 11 when the lower end of the plunger is raised above the lower edge of an opening 32 surrounding the bore and communicating through the bottom 33 of a cavity 34 for which it serves as an outlet. Said bottom 33 of the cavity 34 is provided with a central projection 35 and there is an undercut groove 36 in the peripheral wall of said socket adjacent said bottom, into which groove there is sprung the edge of a strainer 37 supported at the center by said projection 35. This strainer 37 may be of any suitable material and of any suitable construction, such as wire cloth.

The cavity 34 is formed with two portions of which the outer portion 38 is of larger diameter than the inner portion 39, thereby providing an annular shoulder 40. Said outer portion 38 is internally threaded to receive the externally threaded end of a cylindrical reservoir 41. The inner edge of said reservoir may be screwed into engagement with said shoulder 40 but preferably a washer 41′ of suitable grease resisting material is positioned therebetween.

Lubricant in the reservoir 41 is normally urged toward the passage or outlet 32 by means including a piston or follower 42 which, as here shown, consists of two oppositely positioned cupped washers 43 of suitable material engaged on opposite sides by metal plates or disks 44 and held together by the reduced inner end 45 of a rod 46 which extends outwardly through the cap 47 at the outer end of the reservoir 41 and having at its outer end a handle 48. At one end of the reduced lower end 45 there is a shoulder 49 which engages the outer disk 44 and at its other end said reduced end or portion is upset to form a rivet head 50. The follower or piston 42 may be urged towards the outlet 32 by any suitable means such as a coil spring 51 engaging the outer disk 44 and the outer end or cap 47 of the reservoir.

The portion 39 of the cavity 34 is provided with a lateral opening 52 in which is threaded a hollow member 53 including a valve 54 which normally prevents movement of lubricant outwardly therethrough. This valve may be manually controlled by a handle 55 or may be a check valve permitting introduction of lubricant to the reservoir but preventing outward flow thereof. When the reservoir 41 has been substantially emptied by actuation of the pump by means of the handle 24, the threaded outer end of the member 53 may be connected with a pump by which lubricant is forced into the reservoir cavity, and the lubricant acting on the large surface of the follower 42, forces the same back against the action of the spring 51 until the desired quantity of lubricant has entered the reservoir.

If desired, however, the follower may be drawn back by hand and secured in retracted position. For this purpose, the rod 46 is provided with a cross pin 56 relatively close to said follower so that, when the follower is drawn back by the handle 48, the pin 56 may be drawn out through a slot 57 in the cap 47, and the handle may then be turned to seat the pin in the grooves or depressions 58. It will be apparent that the filling of the reservoir may be effected by securing the follower in this way so as to relieve the pressure on the grease or lubricant and then using it as a wrench to turn the reservoir by means of the handle 48 thus unscrewing it from the support 10 so that it may be filled and then replaced.

As hereinbefore stated, the grease gun of the present invention is particularly adapted for use in systems where different guns are permanently mounted. Such permanent mounting may conveniently be effected by angle irons 60 secured to the base of the support 10 by a machine screw 61 and provided with openings 62 to enable them to be secured to other parts by suitable devices, such as screws or bolts.

The operation of the force feed lubricator of my present invention is substantially as follows:

Assuming that the reservoir has a supply of lubricant therein, the pump handle 24 will be actuated whenever required to operate the plunger piston 18 and supply lubricant from the reservoir to the desired location. Upon each upward movement of the handle 24 to substantially limiting upward position, lubricant will be supplied from the reservoir through the passage 32 to the pump cylinder, being urged in that direction by the piston 42 under the urging of the spring 51.

In course of time the supply of lubricant in the reservoir 41 will become exhausted or substantially exhausted and it will then be necessary to refill the reservoir. This may be done by connecting the threaded outer end of the member 53 with a pump connected with a supply drum or receptacle containing lubricant which in case the grease gun is stationary may be brought to the position thereof by suitable means such as a truck or trolley. Upon opening the valve 54 by means of the hand wheel or handle 55 and operating the pump connected with the drum, the lubricant from the drum will be forced through the connection or device 53 and acting on the large surface of the piston 42 will force it back against the action of the spring 51 until the reservoir is filled to the extent desired. The valve 54 is then closed and the connection with the drum containing the supply of lubricant broken.

Another way of filling the reservoir is by withdrawing the piston against the action of the spring 51 by pulling on the handle 48 until the pin 56 is drawn outwardly through the slot 57 and then turning the handle to enable the pin 56 to seat itself in the grooves or depressions 58. Then by turning the handle 48 the reservoir 41 may be unscrewed from the outer portion of the socket 34, so that the reservoir 41 may be filled with lubricant and again connected with the base 10. It will be evident that the feature of permanently securing the strainer 37 in position is of great advantage in connection with either method of refilling the reservoir.

I claim:—

1. The combination with a support having a pump cylinder therein and a socket communicating at its bottom with said cylinder to supply lubricant thereto, said socket including a cylindrical internally threaded outer portion and an inner portion with an undercut groove at the periphery of its bottom, a strainer extending across said bottom and seated at its periphery in said groove, a cylindrical lubricant reservoir having one end detachably secured in the outer portion of said socket, and means including a follower piston to urge lubricant in said reservoir toward said outlet.

2. Force feed lubricating apparatus including a massive casting having means for rigidly securing it to a fixed support at widely spaced points, so as to afford a large area base of support; a relatively small pump cylinder and plunger therein having an axis at right angles to and far within said fixed base of support in all directions; a forwardly projecting bracket on said base having a link pivoted thereto and to a pump operating lever which is also pivoted to said plunger and has its handle extending in the opposite direction from said bracket, the face of said base member opposite said bracket being formed with an inner socket having a grease outlet in its bottom communicating with said pump cylinder when the plunger is retracted, a screen peripherally secured in said socket with its intermediate portions spaced away from said grease outlet; said socket having an outer screw-threaded enlargement and a cylindrical reservoir detachably secured therein with its axis in the plane of reciprocation of the pump handle; a spring pressed piston in said reservoir for force feeding grease toward said inner socket; said inner socket being of substantial depth between the screen and the outer screw-thread and having therein a lateral opening for a conduit whereby grease may be forced into the socket, between the screen and piston to force back the piston and fill the reservoir.

3. Force feed lubricating apparatus including a cylindrical grease reservoir closed at one end and provided with a piston and a spring forcing the piston toward the other end of the reservoir, in combination with a plunger pump comprising a casting having a socket formed with a screw-threaded outer portion with which said reservoir detachably engages and with an inner portion the bottom of which is formed with a passage communicating with a small diameter pump cylinder formed in the casting at right angles to the axis of the reservoir, an operating lever pivotally linked to said casting and pivoted to the plunger and extending and operating in a plane substantially radial to said reservoir; together with a strainer screen adjacent but held out of contact with the bottom of said inner portion of the socket having its peripheral edges secured below the reservoir engaging screw-thread; said casting having a laterally presented portion and means whereby it may be rigidly secured to a fixed support at points spaced apart widely in a plane which is at right angles to the axis of the pump and parallel with and extending beneath the reservoir, to afford a base that is widely braced as against the tilting strain imposed by operation of the pump handle and by weight of the reservoir, while leaving the latter free so that it may be unscrewed for refilling, without disturbing the said screen.

4. A pump for a force feed lubrication system, in combination with a cylindrical lubricant reservoir, means including a follower piston in said reservoir for forcing lubricant toward one end thereof, a closure member having a socket connected at one side of the center of its bottom with a passage leading to said pump and adapted to receive said end of the reservoir, a strainer across the bottom of said socket, and means detachably engaging said strainer at its periphery to detachably secure it against outward displacement and a thrust member tending to displace the center of the screen outwardly, for the purpose described.

5. Force feed lubricating apparatus, including a massive casting and means for rigidly securing it to a fixed support at widely spaced points so as to afford a large area base of support against tilting strains applied to said casting, one lateral face of said casting being formed with a screw-threaded socket, the axis of which is parallel with said support base; a cylindrical grease reservoir closed at one end and adapted to be filled through the other end, said other end being screwed into said socket, its axis extending parallel with said base and supported solely by engagement with said socket so that it is free for unscrewing and refilling; a small area pump cylinder formed in said casting adjacent said socket, at right angles to the axes of said socket and of said support base and communicating with said reservoir; a plunger in said cylinder and a lever pivoted to said casting and to said plunger arranged to swing in the plane of the axes of said pump and of said reservoir.

Signed at New York, in the county of New York, and State of New York, this 15th day of May A. D. 1928.

HERMAN ALBERTINE.